Feb. 10, 1931.  F. W. KUEMMERLEIN ET AL  1,792,018
ILLUMINATED LICENSE PLATE
Filed April 16, 1929

Inventors
F. W. Kuemmerlein
Wm. L. Kuemmerlein

Patented Feb. 10, 1931

1,792,018

UNITED STATES PATENT OFFICE

FREDERICK W. KUEMMERLEIN AND WILLIAM L. KUEMMERLEIN, OF MILWAUKEE, WISCONSIN

ILLUMINATED LICENSE PLATE

Application filed April 16, 1929. Serial No. 355,585.

This invention pertains to illuminated license plates, and has primarily for its object the provision of an exceedingly simple and inexpensive structure which provides for the illuminating of the indicia on the plate by night, and distinct visibility of the same during the day.

Incidental to the foregoing, a more specific object resides in the provision of a device of the foregoing character adapted to be attached to conventional license plate brackets and comprising a two-piece casing in which one section is provided with cut-out indicia covered by a translucent strip of material, and in which the usual license plate attaching bolts serve to secure the sections together, as well as to attach the device to the license plate bracket.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawing, Figure 1 is an elevation of an illuminated license plate constructed in accordance with the present invention and showing the same attached to a conventional license plate bracket;

Figure 1:
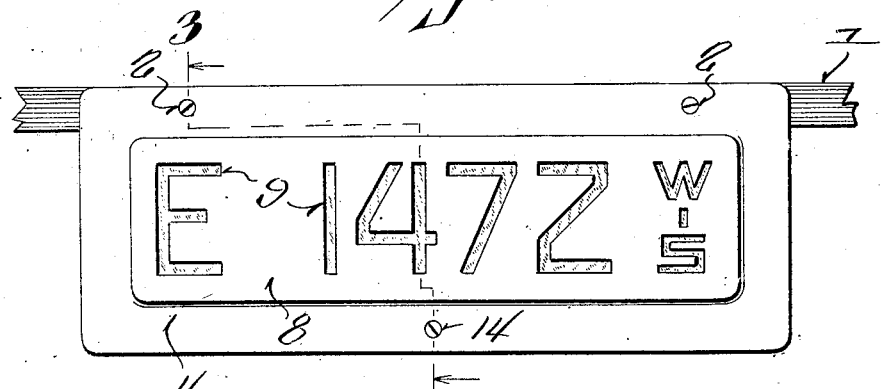
Figure 2:
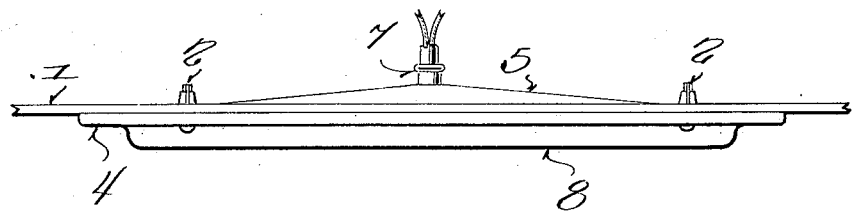
Figure 2 is a plan view of the plate.

Referring now more particularly to the accompanying drawing, the numeral 1 designates any type of conventional license plate bracket to which the usual license plate is attached by means of bolts 2 passing through slots 3 in the bracket.

The present invention, which is designed to illuminate the indicia of the license plate by night and to render the same clearly visible during the day, comprises a two-piece casing including front and rear plates 4 and 5, respectively. The plate 5 is tapered outwardly from its marginal edges toward the center, to provide sufficient space for an incandescent bulb 6 carried by the socket 7 which is attached to the rear plate in any suitable manner.

To further provide sufficient space within the housing for the bulb 6, the front plate 4 is provided with a raised portion 8 which is cut out to provide any desired indicia 9.

Figure 3:
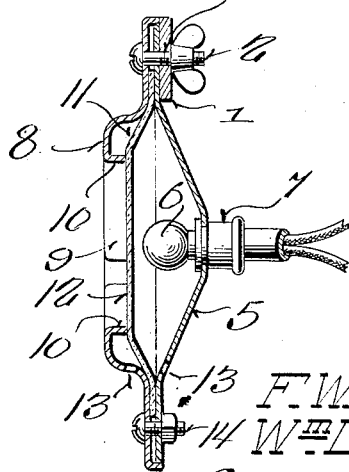
Figure 3 is a transverse section taken on the line 3—3 of Figure 1.

Adjacent the cut-out portions, the edges 10 of the material are turned inwardly for the purpose hereinafter described. The marginal edges of the front plate 4 are turned over to receive the marginal edges of the rear plate 5, as best shown in Figure 3. Thus, when the front and rear plates are assembled, a securely closed housing is provided which prevents the entrance of dirt or water between the engaged portions of the front and rear plates.

As best shown in Figure 1, the cut-out indicia are closed by a strip of translucent material 11, the marginal edges of which are engaged and clamped between the marginal portions of the front and rear plates 4 and 5. The translucent material 11 may be provided in any desired colors to obtain the necessary contrast with the color of the plate 4, in order that the cut-out indicia may be clearly visible during the daytime. In some instances, the strip 4 need merely be frosted to cause the light from the bulb to be diffused through the indicia openings. This arrangement is entirely arbitrary, the purpose of the strip 11 being to serve as a covering for the indicia opening and to diffuse the light from the bulb 6 through the openings, as well as to render the indicia clearly visible during the daytime.

As best seen in Figure 3, the strip 11, which is preferably formed from celluloid or some other inexpensive non-breakable material, is provided with a raised portion 12 which tightly engages the inturned edges 10 of the cut-out portions, thus serving to form a snug fit between the front plate and the strip 11 to prevent the entrance of dirt or moisture.

In the event that a small amount of moisture might find its way into the casing through either the indicia or the edges of the front and rear plates, both the front and rear plates are provided with openings 13 adjacent their bottom portions which will permit such moisture to drain from the casing, thus preventing the same from affecting the operation of the light 6.

From the foregoing, it will be seen that an exceedingly simple and inexpensive structure has been provided whereby the license number of a vehicle may be readily illuminated at night and rendered clearly visible during the daytime.

It will further be seen that the assembly of the casing is materially simplified in that the usual license plate attaching bolts are utilized to attach the device to a conventional bracket, as well as to secure the front and rear plate sections together.

In addition to the foregoing, a single bolt 14 serves to lock the lower portion of the front and rear plates together.

While the present invention provides such a relatively inexpensive structure that the same could be entirely discarded when it is necessary to change numbers it will be appreciated that the rear plate and translucent strip may be retained, if desired, which will require the purchase of merely an additional front plate when a new number is required.

We claim:

A device of the character described, comprising a two piece housing consisting of front and rear plates, the front plate being provided with cut-out indicia and having the edges surrounding the indicia bent inwardly, one of said plates having its marginal edges bent over to engage the marginal edges of the adjacent plate, a translucent strip engaged between the front and rear plates and having a central raised portion for snugly engaging the inturned edges surrounding the indicia, a light carried by the rear plate, and means for clamping the front and rear plates together and attaching the housing to a license plate bracket.

In testimony that we claim the foregoing we have hereunto set our hands at Milwaukee, in the county of Milwaukee and State of Wisconsin.

FREDERICK W. KUEMMERLEIN.
WILLIAM L. KUEMMERLEIN.